United States Patent [19]

Morgan

[11] 3,958,867

[45] May 25, 1976

[54] EYEGLASS STRUCTURE

[76] Inventor: J. Robert Morgan, Palmer Hill Road, Old Greenwich, Conn. 06870

[22] Filed: May 17, 1974

[21] Appl. No.: 470,715

[52] U.S. Cl. .................................. 351/47; 351/49; 351/57; 351/84
[51] Int. Cl.² ............................................ G02C 7/00
[58] Field of Search .................... 351/49, 84, 47, 57

[56] References Cited
UNITED STATES PATENTS

| | | |
|---|---|---|
| 1,471,996 | 9/1923 | Bailey .................................. 351/84 |
| 1,735,021 | 11/1929 | Stewart ................................ 351/84 |
| 2,565,362 | 8/1951 | Eloranta .............................. 351/49 |
| 2,688,900 | 9/1954 | Silverman ........................... 351/49 |

Primary Examiner—R. V. Rolinec
Assistant Examiner—Lawrence J. Dahl
Attorney, Agent, or Firm—Eugene E. Geoffrey, Jr.

[57] ABSTRACT

An eyeglass structure for both corrective bifocal lenses and lenses for modifying light intensity wherein means are provided for changing the physical positions of the lenses on the frame to modify the optical characteristics thereof.

4 Claims, 11 Drawing Figures

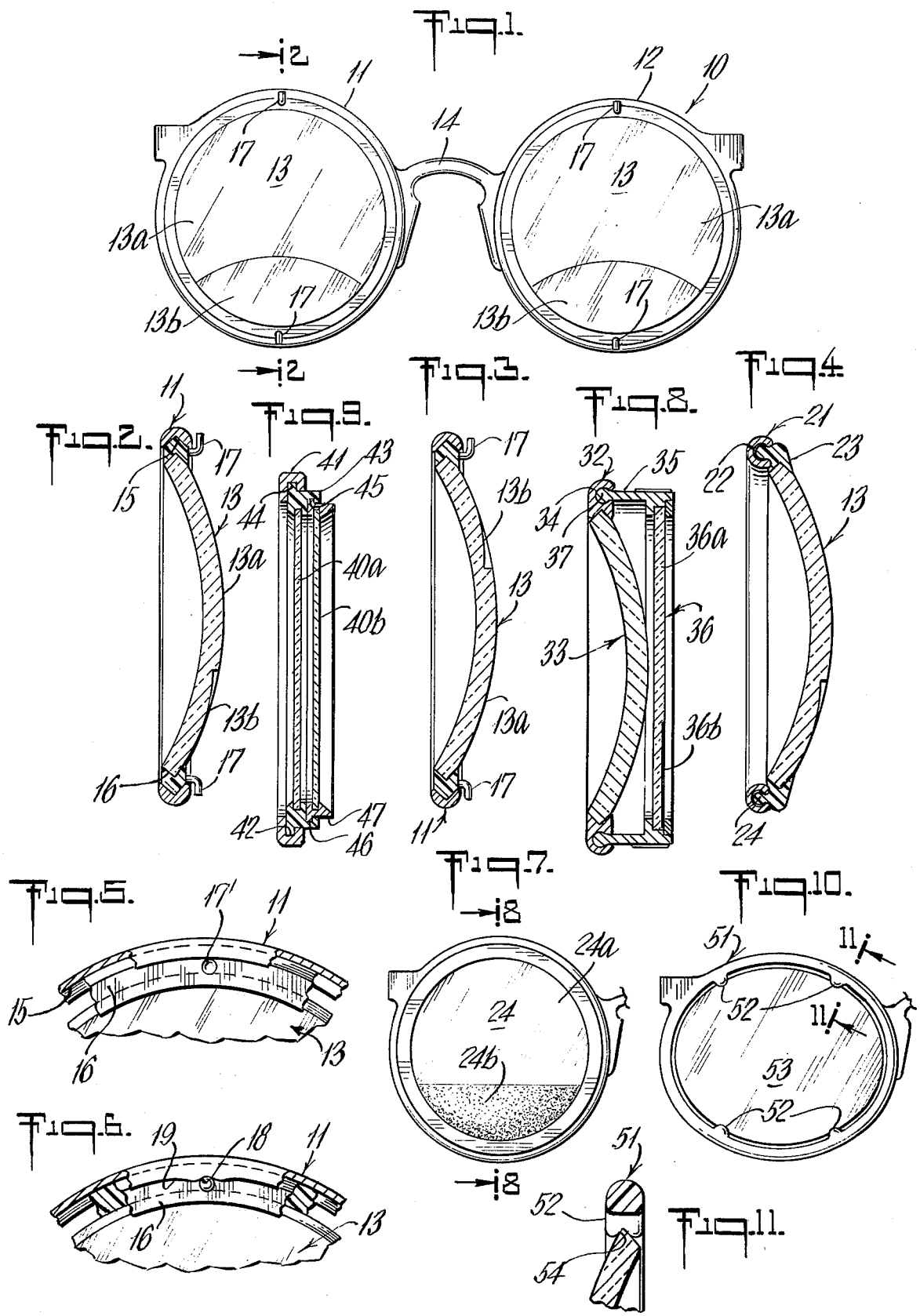

EYEGLASS STRUCTURE

This invention relates to eyeglasses and more specifically to a novel and improved eyeglass structure embodying adjustable lenses to permit the user to modify the positions of corrective lenses such as bifocals or to modify light transmission characteristics as in the case of sunglasses.

Eyeglasses are generally constructed with the lenses being retained in a fixed position within the frame to prevent rotation thereof. This is particularly important in the case of corrective lenses and specifically lenses having either an astigmatic correction or a bifocal construction. In the case of sunglasses, known lenses have uniform light transmitting characteristics throughout their areas. Light responsive sunglasses have been suggested wherein the light transmission is automatically reduced as the intensity of the light falling on the glasses increases. These lenses have not been found to be entirely satisfactory since the degree of response to light is very small so that only very slight changes in light transmission characteristics occur over extremely wide variations in light intensity.

This invention overcomes the difficulties heretofore entailed in providing variable density sunglasses and also provides a novel and improved structure for utilization with bifocal lenses so that the positions of the two corrective lenses in a single lens structure can be modified to accommodate the needs of the user. For instance, should an individual having bifocals desire to do relatively close work above eye level the positions of the shorter focal length lens elements can be shifted to permit the user to view objects positioned above eye level and at normal so-called reading distances. One such example involves the case of work on a ceiling. In that situation the user by repositioning the reading portion of his bifocals can see more clearly without tilting his head backwardly to permit him to look through the normal lower portion of his bifocals.

Another object of the invention resides in a novel and improved eyeglass structure wherein the lenses may be selectively positioned by the user.

Still another object of the invention resides in the provision of novel and improved sunglasses wherein the light transmitting characteristics of the lenses may be readily changed to compensate for variable light intensities.

Still another object of the invention resides in a novel and improved sunglasses having areas of different light transmitting characteristics and wherein the positions of the areas of different characteristics can be shifted to accommodate the needs of the user.

A still further object of the invention resides in a provision of a novel and improved sunglass structure embodying adjustable lenses.

The eyeglasses in accordance with the invention include means on the frame for retaining lenses in a manner that permits effective rotation to either shift the position of the corrective lens portion of the lenses or to shift the lenses of the sunglasses to modify the light transmitting characteristics thereof.

The above and other objects of the invention will become more apparent from the following description and accompanying drawings forming part of this application. In the drawings:

FIG. 1 is an elevational view of one embodiment of eyeglasses in accordance with the invention having adjustable corrective lenses;

FIG. 2 is a cross-sectional view of FIG. 1 taken along the line 2—2 thereof;

FIG. 3 is a view similar to FIG. 2 showing a modified position of the lenses;

FIG. 4 is a cross-sectional view similar to FIG. 2 illustrating modified means for mounting a lens in a frame in accordance with the invention;

FIG. 5 is an enlarged fragmentary portion in partial section of FIGS. 1 and 2;

FIG. 6 is an enlarged view similar to FIG. 5 illustrating improved index means in accordance with the invention;

FIG. 7 is an elevational view of a portion of an eyeglass structure similar to that illustrated in FIG. 1 embodying a lens having areas of variable light transmitting densities.

FIG. 8 is a cross-sectional view of FIG. 7 taken along the line 8—8 thereof;

FIG. 9 is a cross-sectional view of a still further embodiment of the invention utilizing a pair of independently adjustable polarizing lenses;

FIG. 10 is an elevational view of part of an eyeglass structure illustrating a modified arrangement for shifting position of the lens;

FIG. 11 is a cross-sectional view of FIG. 10 taken along the line 11—11 thereof;

Referring now to the drawings and more specifically to FIGS. 1 and 2 showing one embodiment of the invention, the eyeglass frame is generally denoted by the numeral 10. It includes circular lens frame portions 11 and 12 each carrying a bifocal lens 13 having a relatively long focal length portion 13a and a short focal length portion 13b. The frame portions 11 and 12 are connected by a conventional nose piece 14 and each includes a conventional side member not shown for holding the glasses in position on the wearer. Inasmuch as the lens frame portions 11 and 12 are identical, only the portion 11 will be described in the instant embodiment of the invention. The lens frame portion 11 has an annular recess 15 on the inner edge thereof for rotatably retaining a ring 16, the latter carrying the lens 13. The annular ring 16 carries a pair of outwardly extending pins 17 to facilitate rotation of the lens 13 by the user. The outer ends of the pins 17 are preferably bent outwardly to afford greater ease of adjustment of the lens. With this arrangement the user can, at will, shift the relative positions of the two portions of each lens so that the shorter focal length portion 13b can be at the bottom for reading or working on objects below eye level or the position of the lens portion 13b can be shifted to the top part of the frame in order to facilitate work above eye level. Rotation of the lens for work above eye level is illustrated in FIG. 3. With the utilization of lenses 13 formed of glass it is preferable to employ the annular ring 16 in order to facilitate attachment of the pins 17 for rotation of the lens. It is evident, however, that the lens could be drilled to receive the pins 17 in which event the outer periphery thereof would slidably engage the recess 15 in each frame portion. Lenses formed of plastic may be very easily drilled for pins and thus the annular ring 16 would not be required.

A modified embodiment of the invention is illustrated in FIG. 4. In this embodiment of the invention the frame portion 21 which corresponds to the frame portion 11 of FIG. 1 is of annular configuration and has an annular groove 22 in the front side thereof. The groove 22, in cross-section, has an angular width slightly greater than 180° and is adapted to receive a ring 23 having rearwardly extending portion 24 of essentially circular cross-section and having a diameter only slightly less than the diameter of the groove 22. The ring 23 carries a bifocal lens 13 and upon mounting the lens 13 in the ring 23 the ring 23 can be readily snapped into engagement with the frame portion 21. Inasmuch as the rearwardly extending portion 24 on the ring 23 slidably engages the groove 22 the lens 13 can be easily rotated relative to the frame.

FIG. 5 is an enlarged fragmentary portion of FIG. 2 and illustrates the relative position of the elements including the position of one of the pins 17. In certain instances, indexing means as illustrated in FIG. 6 may be employed. For this purpose the frame portion 11 is formed with a small recess 18 and slightly inclined portions 19 on each side of the recess 18 so that as a pin approaches one of the inclined portions 19 it will be deflected slightly toward the center of the lens until it reaches the recess 18 whereupon by reason of the resiliency of the material will move outwardly and into the recess 18 to fix the lens in position. Since only slight friction is required to retain the lens in position the recess 18 would be very shallow and thus a relatively small deflection of the pin would be required to permit it to engage the recess 18. In certain cases it might be desirable to use a plurality of recesses depending on the number of annular positions which may be required for the lens. This would be more significant in connection with sunglasses having portions of different light transmitting characteristics as will be described.

FIG. 7 illustrates an embodiment of the invention for use as sunglasses and, except for the lens 24, the structure is substantially identical to that shown in FIGS. 1 and 2. For illustrative purposes, the top portion 24a of the lens 24 is shown as being only slightly tinted to provide moderate light transmitting characteristics while the bottom section 24b is shown as being more heavily tinted in order to provide substantial reduction in light transmission. In this arrangement the portions 24a and 24b can be shifted to any desired position so that the darker portion can be arranged to intercept light from directions of greater intensity. For instance, it may be desirable on the sandy beach to have the darker portion at the bottom side of the lens whereas in other areas of bright sunlight it may be desirable to have the darker portion at the top of the lens. If desired, a lens, such as the lens 24, may be utilized in combination with normal corrective lenses as illustrated in FIG. 8. In this figure one frame portion, generally denoted by the numeral 32, carries a corrective lens 33 in the normal manner. The front of the frame portion 32 is provided with an annular recess 34 similar to recess 22 of FIG. 2. A cylindrical member 35 carrying a lens 36 having areas of different light transmitting characteristics, such as 36a and 36b, is provided with an annular bead 37 for rotatable engagement with the recess 34. With this arrangement the cylindrical member 35 can be readily engaged or disengaged from the frame portion 32 as desired and when in position on the frame portion may be readily rotated as in the case of the structure illustrated in FIG. 7.

A still further modification of the invention is illustrated in FIG. 9 which utilizes two independently rotatable light polarizing lenses 40a and 40b. The frame portion is denoted by the numeral 41 and corresponds to the frame portion 11 of FIG. 1. An annular recess 42 is provided for rotatably carrying a first lens ring 43 having an annular ridge 44 engaging the recess 42. The lens ring 43 carries a first polarizing lens 40a which is therefore rotatable relative to the frame portion 41. The outer portion of the lens ring 43 has an annular recess 45 for the rotatably engaging of an outwardly extending flange 46 forming part of a second lens ring 47. The lens ring 47 carries the second polarizing lens 40b which is therefore rotatable independently of the lens 40a. With this arrangement, any degree of light transmission can be obtained by relatively positioning the lenses 40a and 40b and both lenses can be simultaneously rotated relative to the frame portion 41.

A further embodiment of the invention is illustrated in FIGS. 10 and 11 and provides for shifting the lens position when both the lens and frame are non-circular. For purposes of illustration, the frame portion is denoted by the numeral 51 and is of generally eliptical configuration and has four inwardly extending lens retaining elements 52 formed integrally with the frame portion 51. The lens 53 has notches 54 to engage the retaining elements 52 for automatically aligning the lens with the frame portion 51. The lens retaining elements 52 are notched as denoted by the numeral 52' to engage the lens and hold it in the aligned position on the frame portion. With this arrangement, the lens 53 can be easily snapped into position and removed from the frame portion and by having the lens retaining elements 52 in proper alignment the lens 53 can be readily positioned to occupy either one of two different positions on the frame and thus afford the same advantage attained with the embodiment of the invention shown in FIGS. 1 and 2.

While only certain embodiments of the invention have been illustrated and described it is understood that modifications, alterations, and changes may be made without departing from the scope and spirit of the invention as defined in the appended claims.

What is claimed is:

1. An eyeglass structure comprising an eyeglass frame including a pair of generally annular elements joined by a nose bridge, a pair of lens carrying elements overlying said annular elements, annular grooves in one pair of elements, annular ridge means of deflectable material carried by the other pair of elements, said ridge means on each of said other pair of elements removably engaging an annular groove in an element of said one pair of elements, said ridge means being in snap-fit rotatable relation thereto.

2. An eyeglass structure according to claim 1 wherein said first pair of annular elements each include said annular groove and each of said lens carrying elements includes a rearwardly extending cylindrical portion having means on the end thereof releasably and slidably engaging the groove on one of said annular elements.

3. An eyeglass structure according to claim 2 wherein said annular grooves each have a circular cross section slightly greater than 180° and are disposed in the front face of each of the first said annular elements and the cylindrical portion on each of said lens carrying elements terminates in an annular member of circular cross section releasably engaging one of said grooves.

4. An eyeglass structure according to claim 1 wherein each of said first pair of annular elements includes an annular groove on the front surface thereof having a circular cross section slightly greater than 180° and the last said means includes an annular member of circular cross section extending from the rear surface of each of said lens carrying elements.

* * * * *